(12) United States Patent
Cao et al.

(10) Patent No.: US 11,138,552 B2
(45) Date of Patent: Oct. 5, 2021

(54) ESTIMATION OF NODE PROCESSING CAPACITY FOR ORDER FULFILLMENT

(71) Applicant: International Business Machines Corporation, Armonk, NY (US)

(72) Inventors: Lei Cao, Worcester, MA (US); Ajay Ashok Deshpande, White Plains, NY (US); Ali Koc, White Plains, NY (US); Yingjie Li, Chappaqua, NY (US); Xuan Liu, Yorktown Heights, NY (US); Brian Leo Quanz, Yorktown Heights, NY (US); Yada Zhu, Irvington, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/836,814

(22) Filed: Dec. 8, 2017

(65) Prior Publication Data

US 2018/0204171 A1 Jul. 19, 2018

Related U.S. Application Data

(63) Continuation of application No. 15/407,736, filed on Jan. 17, 2017, now Pat. No. 10,929,808.

(51) Int. Cl.
*G06Q 10/08* (2012.01)
(52) U.S. Cl.
CPC ................. *G06Q 10/087* (2013.01)
(58) Field of Classification Search
CPC ................................................ G06Q 10/087
See application file for complete search history.

(56) References Cited

U.S. PATENT DOCUMENTS

| 4,827,423 A | 5/1989 | Beasley et al. |
| 6,609,101 B1 * | 8/2003 | Landvater .............. G06Q 10/06 705/7.25 |
| 7,552,066 B1 * | 6/2009 | Landvater ........ G06Q 10/06315 705/7.25 |

(Continued)

OTHER PUBLICATIONS

Screen captures from YouTube video clip entitled "Equvalent Units.mp4," 4 pages, uploaded on Jun. 17, 2012 by user "Linda Williams". Retrieved from Internet: <https://www.youtube.com/watch?v=nETeUa0Bts4&feature=youtu.be>.*

(Continued)

*Primary Examiner* — Florian M Zeender
*Assistant Examiner* — Whitney Poffenbarger
(74) *Attorney, Agent, or Firm* — Amin, Turocy & Watson, LLP

(57) ABSTRACT

Techniques for facilitating estimation of node processing capacity values for order fulfillment are provided. In one example, a computer-implemented method can comprise: generating, by a system operatively coupled to a processor, a current processing capacity value for an entity; and determining, by the system, a future processing capacity value for the entity based on the current processing capacity value and by using a future capacity model that has been explicitly trained to infer respective processing capacity values for the entity. The computer-implemented method can also comprise fulfilling an order of an item, by the system, based on the future processing capacity value.

10 Claims, 13 Drawing Sheets

(56) References Cited

U.S. PATENT DOCUMENTS

| | | | | |
|---|---|---|---|---|
| 7,974,723 | B2* | 7/2011 | Moyne | G05B 19/41865 700/101 |
| 8,499,066 | B1 | 7/2013 | Zhang et al. | |
| 8,806,003 | B2 | 8/2014 | Brown et al. | |
| 8,818,836 | B1* | 8/2014 | Braumoeller | G06Q 10/063 705/7.25 |
| 9,253,325 | B1 | 2/2016 | Smith | |
| 2001/0016821 | A1* | 8/2001 | DeBusk | G06F 17/30 705/2 |
| 2003/0126045 | A1* | 7/2003 | Ogawa | G06Q 10/087 705/28 |
| 2003/0158795 | A1* | 8/2003 | Markham | B23Q 35/12 705/28 |
| 2004/0167831 | A1* | 8/2004 | Matsumoto | G05B 19/41865 705/28 |
| 2007/0174151 | A1* | 7/2007 | Anderson | G06Q 10/08 705/28 |
| 2007/0203810 | A1 | 8/2007 | Grichnik | |
| 2012/0265881 | A1 | 10/2012 | Chen et al. | |
| 2013/0103442 | A1 | 4/2013 | Burks et al. | |
| 2013/0139152 | A1* | 5/2013 | Chang | G06F 9/45545 718/1 |
| 2014/0317283 | A1* | 10/2014 | Brown | G06F 9/5044 709/224 |
| 2015/0356501 | A1 | 12/2015 | Gorjestani et al. | |
| 2015/0379536 | A1 | 12/2015 | Gopinath et al. | |

OTHER PUBLICATIONS

Williams, et al., "Predicting retailer orders with pas and order data: The inventory balance effect," European Journal of Operational Research 232 (2014), pp. 593-600.

Francis, et al., "Smarter Analytics: Increase Business Success by Applying IBM Business Analytics and IBM Smarter Commerce Solutions," Publication Date: Sep. 26, 2013, 24 pages.

Mel, et al., "The NIST Definition of Cloud Computing," Recommendations of the National Institute of Standards and Technology, Sep. 2011, 7 pages.

Office Action dated Oct. 31, 2018 for U.S. Appl. No. 15/407,736, 87 pages.

Lumen, "3.5 Process Costing (FIFO Method)", URL: https://courses.lumenlearning.com/sac-managacct/chapter/equivalent-units-and-cost-per-equivalent-units-fifo-method/, Managerial Accounting, Chapter 3: Process Cost System, retrieved on Oct. 31, 2018, 9 pages.

Final Office Action received for U.S. Appl. No. 15/407,736 dated Mar. 8, 2019, 36 pages.

Non-Final Office Action received for U.S. Appl. No. 15/407,736 dated Aug. 16, 2019, 50 pages.

Final Office Action received for U.S. Appl. No. 15/407,736 dated Feb. 21, 2020, 41 pages.

* cited by examiner

ESTIMATION OF NODE PROCESSING CAPACITY FOR ORDER FULFILLMENT

BACKGROUND

The subject disclosure relates to information processing, and in particular relates to node processing capacity for order fulfillment.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate estimation of node processing capacity for order fulfillment are described.

According to an embodiment, a computer-implemented method can comprise generating, by a system operatively coupled to a processor, a current processing capacity value for an entity. The computer implemented method can also comprise determining, by the system, a future processing capacity value for the entity based on the current processing capacity value and by using a future capacity model that has been explicitly trained to infer respective processing capacity values for the entity. Further, the computer implemented method can also comprise fulfilling an order of an item, by the system, based on the future processing capacity value.

According to another embodiment, a system is provided. The system comprises a processor that executes computer executable components stored in memory. The computer executable components include an order intake component that receives incoming order information. Further, the computer executable components also include a future capacity component that operates according to a future capacity model that has been implicitly and/or explicitly trained to infer respective processing capacity of entities associated with a production processing chain associated with the incoming order information. Further, the computer executable components also include a scheduling component that processes the incoming order information based on an inference regarding a respective processing capacity of one or more of the entities.

According to another embodiment, a computer program product for facilitating estimation of node processing capacity values for order fulfillment is provided. The computer program product can comprise a computer readable storage medium having program instructions embodied therewith, the program instructions executable by a processing component to cause the processing component to schedule an order based on inferences regarding respective capacities of entities. The program instructions when executed by the processing component further cause the processing component to receive incoming order information. Further, the program instructions when executed by the processing component further cause the processing component to utilize a future capacity model that has been explicitly and implicitly trained to infer respective processing capacity values of entities associated with a production and fulfillment processing chain associated with the incoming order information. Additionally, the program instructions when executed by the processing component further cause the processing component to schedule the order based on inferences regarding respective capacities of the entities.

DETAILED DESCRIPTION

Figure 1:
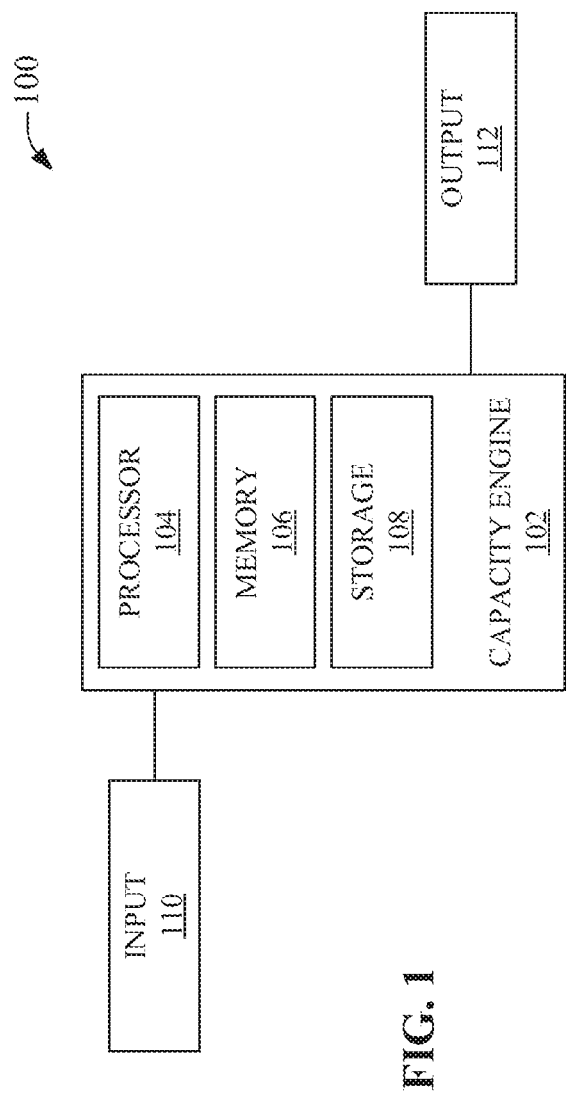
FIG. 1 illustrates a block diagram of an example, non-limiting system that facilitates estimation of node processing capacity values for order fulfillment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The subject disclosure is directed to computer processing systems, computer-implemented methods, apparatus and/or computer program products that facilitate estimation (without direct human involvement) of processing node device processing capacity to facilitate order fulfillment. Humans are unable to perform the embodiments described here as they include, but are not limited to, receiving incoming order information for products and/or services using a future capacity model that has been trained to infer respective processing capacity values for entities associated with fulfillment processing chain associated with the order, and scheduling and processing the order to fulfillment based on inferences regarding the respective capacities of the entities, wherein the entities are respectively one of: an individual, a set of individuals, or a machine or set of machines. In particular, establishing and using a future capacity model that has been explicitly and implicitly trained to infer respective processing capacity values for entities associated with fulfillment processing chain associated with the order, can entail processing countless thousands of historical records relating to past histories of entities to determine their respective processing capabilities. For instance, inferring respective processing capacity values for entities can involve developing artificial neural networks based on the capabilities of each entity (or, one or more entities) in the fulfillment processing chain. Artificial neural networks can comprise pluralities of input nodes connected, via pluralities of connections, to pluralities of intermediate hidden nodes. The pluralities of intermediate hidden nodes in turn can be connected, via further pluralities of connections, to terminal nodes. Each of the pluralities of connections (or, one or more connections) that connect the pluralities of input nodes to intermediate hidden nodes, and intermediate hidden nodes to terminal nodes can be associated with transition probabilities that can be determined using, for example, normalized exponential functions, such as a softmax function. There can be numerous connections between the various input nodes, intermediate hidden nodes, and terminal nodes. Further, since transition probabilities can change as entities, for example, become more proficient at tasks or, in the case of machinery, become less productive due to obsolescence and/or wear and tear on component parts, determination of transition probabilities can be computationally intense.

One or more aspects of the subject disclosure is directed to computer processing systems, computer-implemented methods, apparatus and/or computer program products that facilitate efficiently, effectively, and automatically (e.g., without direct human involvement) generating, by a system operatively coupled to a processor, a current processing capacity value for an entity, determining, by the system, a future processing capacity value for the entity based on the current processing capacity value, and fulfilling or scheduling, by the system, an order of an item for sale based on the future processing capacity value. The computer processing systems, computer-implemented methods, apparatus and/or computer program products employ hardware and/or software to solve problems that are highly technical in nature. For example, problems related to facilitating estimation of node or entity capacity values for order fulfillment based on developing artificial neural networks that model node and entity capacities, are problems that are not abstract and cannot be performed as a set of mental acts by a human. For example, a human, or even thousands of humans, cannot efficiently, accurately and effectively manually develop an artificial neural network to generate a current processing capacity value for an entity or processing node, determine a future processing capacity value for the entity or processing node based on the current processing capacity value, and thereafter fulfill or schedule an order of an item for sale based on the determined future processing capacity value.

Constant changes with respect to newer machinery, faster processors in computing devices, more capable labor force (e.g., through continual training and/or on-the-job acquired expertise) are not taken into account in optimization of order processing and/or order fulfillment. In one or more embodiments an effective e-commerce order fulfillment strategy typically takes into consideration backlog days, that is, how many days orders can realistically be shipped or processed after the order has been sourced to a particular processing node device. The accuracy of the computed backlog can be crucial and critical to a fulfillment system comprising a network of processing node devices.

Thus, for a particular processing node device and an associated mix of other data related to supply chain dynamics, labor capabilities and scheduling (e.g., vacation schedules, scheduled and unscheduled sick days, etc.), machine maintenance schedules, etc., the backlog associated with the device can be determined based on the tasks already sourced to the device and the daily processing capacity of the processing node device (e.g., the number of tasks the processing node device can process in a defined time period). In current fulfillment systems the daily processing capacity of a processing node device can be estimated and predefined utilizing historical data representing a capacity of the particular processing node device. For instance, historical data can indicate that since a processing node device can have processed a first specified quantity of assigned tasks over a prior defined time period (e.g., previous 6 hours, previous 12 hours, previous 24 hours, previous 7 days, previous 30 days, . . . ), going forward, the processing node device at issue should be predictably be able to process a second specified quantity of assigned tasks in a defined future time period. Such an optimization scheme however can be subject to the criterion that each task (or, in some embodiments, one or more tasks) is identical and is being processed using an identical quantum of processing resources. In reality however the processing resources used by a processing node device to accomplish differing tasks can vary widely and can be based on an experience quotient value and proficiency quotient value. The number of tasks that can be processed by disparate processing node devices in a defined time interval can thus be significantly different, and as a consequence a backlog determination can largely deviate from the actual number of tasks that are processed by a processing node device.

FIG. 1 illustrates a block diagram of an example, non-limiting system 100 that facilitates estimation of node processing capacity values for order fulfillment in accordance with one or more embodiments described herein. Aspects of systems (e.g., non-limiting system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, non-limiting system 100 can be any type of component, machine, device, facility, apparatus, and/or instrument that comprises a processor and/or is capable of effective and/or operative communication with a wired and/or wireless network. Components, machines, apparatuses, devices, facilities, and/or instrumentalities that can comprise non-limiting system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated, non-limiting system 100 can comprise capacity engine 102, processor 104, memory 106 and/or storage 108. In some embodiments, one or more of the capacity engine 102, processor 104, memory 106 and/or storage 108 can be communicatively and/or electrically coupled to one another to perform one or more functions of system 100. In some embodiments, capacity engine 102 can receive as input 110 historical data representing capacity information regarding the quantity of assigned tasks that a processing node device has been able to complete over a prior defined time period (e.g., previous 6 hours, previous 12 hours, previous 24 hours, previous 7 days, previous 30 days, . . . ), supply chain dynamic data, labor capabilities and scheduling data, machine maintenance schedule data, as well as new data representing feedback data from ongoing, continuing and continual use of capacity engine 102.

In accordance with an embodiment, capacity engine 102 on receiving historical data and/or new data can, for example, through Fourier analysis, remove a periodic signal from a time series based on the historical data and/or new data to generate an updated time series. In accordance with an additional embodiment, capacity engine 102 can also apply a decay function, such as an exponential decay function, to the updated time series to generate a predicted capacity value for the processing node device.

Further, in an additional embodiment, capacity engine 102 can add to the predicted capacity value an average processing capacity value for a defined period of time that represents a trend determined, by capacity engine 102, for a future time period based at least on the historical data and/or new data. The predicted capacity value can subsequently be output as output 112. The predicted capacity value can be used to determine, whether a given processing node device can satisfy a service level agreement (SLA) requirement to meet an entity's expectations. The predicted capacity value can also be used to determine and identify a cheapest sourcing solution, or to avoid directing more orders to already heavily backlogged processing node devices for purposes of workload balancing across a network of processing node devices.

In a further additional embodiment, capacity engine 102 can perform an optimization process. The optimization process can use backlog day data and a mix of other data related to supply chain dynamics, labor capabilities and scheduling (e.g., vacation schedules, scheduled and unscheduled sick days, etc.), machine maintenance schedules, and the like to determine, whether a given processing node device, based at least on factors such as labor capabilities and scheduling, machine maintenance schedules, supply chain dynamics, and the like, can satisfy a service level agreement (SLA) requirement. A service level agreement can include information regarding whether an ordered product will be delivered in 1-2 days, 5-7 business days, etc. to meet an entity's expectations, while still finding the cheapest source solution, or to avoid sourcing more orders to already heavily backlogged fulfillment processing node devices for purposes of workload balancing across a network of processing node devices. As used in the subject disclosure, an entity can be a user, a business organization, a machine, a computer, equipment, and the like.

On receiving historical data as input 110, capacity engine 102 can determine a processing capacity value associated with a processing node device comprising a network of processing node devices. The processing capacity value can be based on received historical data and/or received new data representing feedback from ongoing, continuing and continual use of system 100. The received historical data and received new data can be received as input 110. Further, the determined and generated processing capacity value can be dynamically adjusted as time proceeds based on a time aware data prioritization strategy that reflects levels of urgency associated with different days in the order fulfillment paradigm. Days that are more distant in the future from a delivery date are assigned lesser levels of urgency than days that are more proximate to the delivery date. Additionally, the determined and generated processing capacity value can be adjusted as time proceeds based on a processing capacity evolvement pattern that can have been determined from the received historical data as well as the new data received as feedback information.

In accordance with an embodiment, capacity engine 102 can make backlog determination more accurate. Further, in an additional embodiment, utilization of capacity engine 102 can improve the accuracy of the determinations of processing capacity values for each node device (or, in some embodiments, one or more node devices) comprising the network of processing node devices, and therefore can additionally make backlog determination more accurate. In an additional embodiment, use of capacity engine 102 accommodates for proficiency differences that can be associated with differing tasks. As will be appreciated, some tasks can be more complex to perform to completion and thus can take a commensurately longer period of time to process, while other tasks can be relatively simple to process to completion and thus can be completed in shorter durations of time. Capacity engine 102 does not, as a general rule, base its determinations on the processing capabilities of respective processing node devices, but rather, through feedback, updates determined processing capacity values based on new data which provides for periodic adjustment based on processing capacity evolvement patterns that can have been determined from historical data received as input 110.

In the context of historical data, historical data can be stored in a database device of database devices that for the purposes of exposition can be represented as storage 108. However, as will be appreciated by those of ordinary skill, historical data can also be obtained as input (e.g., input 110) from a multitude of different and disparate database devices that can comprise a network database devices that can be communicatively and operatively coupled to capacity engine 102.

In an embodiment, capacity engine 102 can use the number of tasks assigned to a processing node device to determine a current capacity value for the processing node device. The current capacity value for a processing node device can be determined based at least on a first number representing a first number of unprocessed tasks (e.g., tasks that were unprocessed by the processing node device from a prior time period) at a beginning of a defined time period. To this can be added a second number representing a second number of tasks assigned to the processing node device at the beginning of the defined time period (e.g., tasks that have been assigned to the processing node device at the beginning of the current defined time period), and a third number representing a third number of tasks unprocessed at an end or conclusion of the defined time period. This current capacity value can be output as output 112 and can be used to predict a future processing capacity value (as discussed in greater detail with reference to FIG. 4) for the processing node device in one or more subsequent time periods.

Capacity engine 102 in accordance with an embodiment can predict the future processing capacity value for a processing node device in one or more future time periods. Capacity engine 102 can predict the future processing capacity value by taking into consideration the influence of time. The closer in time to a due date for fulfillment of an order, the more similar the predicted future processing capacity value for the processing node device will be in relation to the determined current capacity value for the due date.

Capacity engine 102 in accordance with a further embodiment can predict the future processing capacity value for a processing node device in one or more future time periods by considering long-term/short-term patterns that can have been determined from the historical data. Historical processing capacities for each processing node device (or, in some embodiments, one or more processing node devices) in a network of processing node devices can be modeled as a time series, for example, at a hourly, daily, weekly, monthly, . . . time granularity. The determined hourly, daily, weekly, monthly, . . . current processing capacity can then be considered as a value of a time series that shows periodical patterns at different levels, such as, seasonal patterns caused by seasonal adjustments in various factors, such as labor, machine maintenance schedules, and the like.

Figure 2:
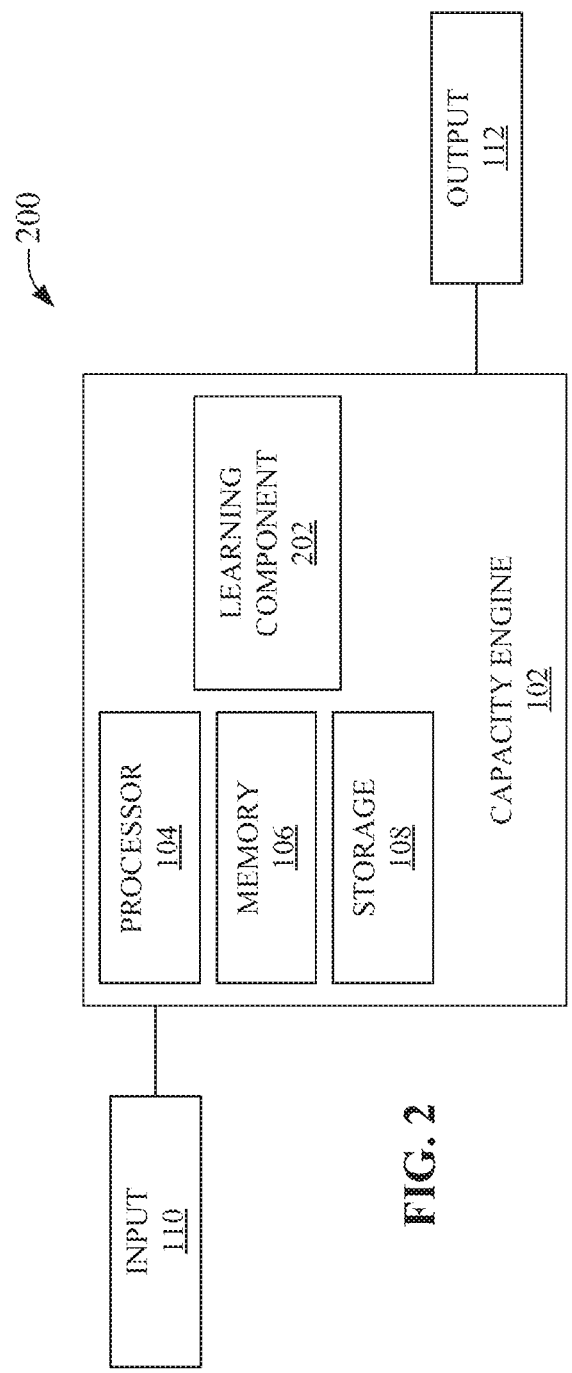
FIG. 2 illustrates another block diagram of an example, non-limiting system that facilitates estimation of node processing capacity values for order fulfillment in accordance with one or more embodiments described herein.

FIG. 2 illustrates another block diagram of an example, non-limiting system that facilitates estimation of node processing capacity values for order fulfillment in accordance with one or more embodiments described herein. Repetitive description of like elements employed in other embodiments described herein is omitted for sake of brevity.

Non-limiting system 200 can comprise one or more of the components and/or functionality of system 100, and vice versa. As illustrated, capacity engine 102 of system 200 can comprise learning component 202 that based at least on historical data and/or new data determines a current processing capacity value for each processing node (or, in some embodiments, one or more processing nodes) that comprises a network of processing nodes. Learning component 202 can determine the processing capacity for each processing node (or, in some embodiments, one or more processing nodes) by determining for a defined time period (e.g., 1 hour, 2 hours, 4 hours, 6 hours, 12 hours, 24 hours, 1 week, 2 weeks, 3 months, 4 months, 6 months, 12 months, etc.) a number of tasks that had not been processed from a previous defined time period. Learning component 202 can then add a number of tasks that have currently been assigned to the processing node for processing within the defined time period. Learning component 202 can then subtract the number of tasks the processing node device was unable to process at the end of the defined time period. The formula used by learning component 202 to determine the processing capacity for each processing node (or, in some embodiments, one or more processing nodes) is provided as:

$$PC_{i,j} = (N_{i,j-1} + A_{i,j}) - U_{i,j+1},$$

where PC represents a processing capacity for each processing node device (i) for a defined time period j; N represents a number of tasks that have not been processed by the processing node device (i) from a previous defined time period (j−1); A represents a number of tasks that have currently been assigned to the processing node device (i) for processing within the defined time period (j); and U represents a number of tasks that the processing node device is unable to process at the end/commencement of the next defined time period (j+1).

The determination by learning component 202 of processing capacity values provides a current processing capacity value for a processing node device comprising the network of processing node devices. The current processing capacity value can thereafter also be used to predict a future processing capacity value for the processing node device in one or more future time periods.

Learning component 202 can also establish a time series model based on historical data comprising a series of data points ranked in a time order from an earliest point to a recent point in time for each processing node device (or, in some embodiments, one or more processing node devices) comprising a network of processing node devices. Learning component 202 can construct a time series model, for example, by extracting from the historical data the number of tasks that had not been processed for each processing device (or, in some embodiments, one or more processing devices) after the elapse of a first time period (e.g., after the first hour). The number of tasks that had not been processed after the first time period can form an initial data point in the time series model. The number of tasks that had not been processed after the elapse of a second time period (e.g., after the second hour) can form another data point in the time series model. From the historical data, a similar time series model can also be developed for the number of tasks that were processed for each processing device (or, in some embodiments, one or more processing devices). For instance, the number of completed tasks for each processing device (or, in some embodiments, one or more processing devices) at the end of the first hour of elapsed time can be a first data point in the time series mode. The number of completed tasks for each processing device (or, in some embodiments, one or more processing devices) at the end of the second hour of elapsed time can be a second data point in the time series. The time series model established by learning component 202 can provide a time granularity that can be used by capacity engine 102 to determine the current processing capacity value for processing node devices included in the network of processing node devices. Moreover, the time series model can represent periodicity patterns such as seasonal variations caused by seasonal adjustments associated with tasks supplied to processing node devices.

In order to perform the foregoing learning component 202 can employ a probabilistic based or statistical based approach, for example, in connection with making determinations or inferences. Inferences can be based in part upon explicit training of classifiers or implicit training based at least upon system feedback and/or an entity's previous actions, commands, instructions, and the like during use of the system. Learning component 202 can employ any suitable scheme (e.g., neural networks, expert systems, Bayesian belief networks, support vector machines (SVMs), Hidden Markov Models (HMMs), fuzzy logic, data fusion, etc.) in accordance with implementing various automated aspects described herein. Learning component 202 can factor historical data, extrinsic data, context, data content, state of the entity, and can compute cost of making an incorrect determination or inference versus benefit of making a correct determination or inference. Accordingly, a utility-based analysis can be employed with providing such information to other components or taking automated action. Ranking and confidence measures can also be calculated and employed in connection with such analysis.

In accordance with an embodiment, learning component 202 can be an artificial neural network (ANN) such as a network where connections between nodes (or neurons) form a directed cycle that creates an internal state of the network that allows learning component 202 to exhibit a dynamic temporal behavior (e.g., the network automatically and dynamically adapts over time and during each iteration (or, in some embodiments, one or more iterations)). Learning component 202, can be defined by a plurality of input nodes, a plurality of connections between the plurality input nodes to a plurality of hidden nodes, and ultimately a plurality of connections from the plurality of hidden nodes to a plurality of terminal nodes. The connections between the plurality of input nodes to the plurality of hidden nodes and from the plurality of hidden nodes to the plurality of terminal nodes can be associated with transitional probabilities that can represent relative probabilities associated with transitioning from a first node in the artificial neural network to a second node in the artificial neural network. The transitional probabilities associated with each of (or, in some embodiments, one or more of) the connections can be determined using a normalized exponential function, such as a softmax function. Thus, based on a first node in the artificial neural network being activated, a second node in the artificial neural network can be selected for activation based on transitional probabilities associated with a plurality of connections that can emanate from the activated node (e.g., the first node) to a non-empty set of possible second nodes to which the eventually selected second node is a member. The process of activating nodes based on connections to other nodes and associated transitional probabilities can be repeated until finally, terminal nodes are triggered. The triggering of the terminal nodes determines the output that is to be output.

Figure 3:
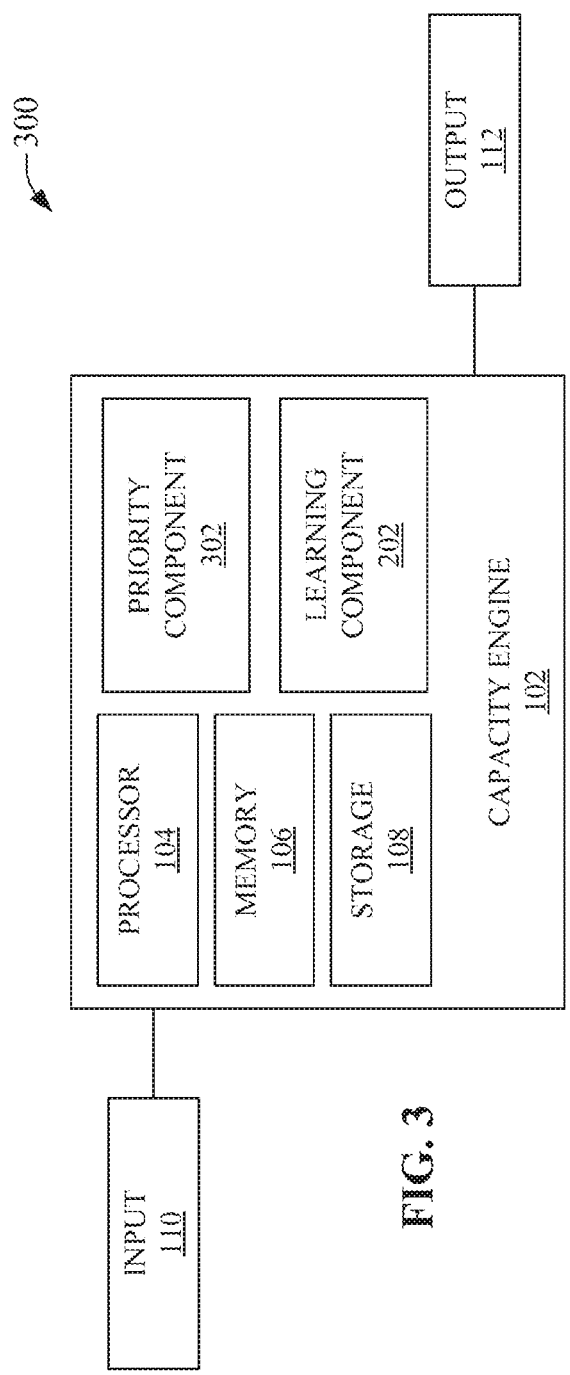
FIG. 3 illustrates another block diagram of an example, non-limiting system that facilitates estimation of node processing capacity values for order fulfillment in accordance with one or more embodiments described herein.

FIG. 3 illustrates another block diagram of an example, non-limiting system that facilitates estimation of node processing capacity values for order fulfillment in accordance with one or more embodiments described herein. Repetitive description of like elements employed in other embodiments described herein is omitted for sake of brevity.

System 300 can comprise one or more of the components and/or functionality of systems 100, 200 and vice versa. As shown, in some embodiments, capacity engine 102 of system 300 can comprise priority component 302 and learning component 202, along with one or more other components shown with reference to FIG. 1. Priority component 302 can provide a time aware prioritization that reflects a level of urgency associated with different days in the order fulfillment paradigm. As will be appreciated by those of ordinary skill in the context of order fulfillment, the closer it gets to a deadline date, the higher the urgency level value that can be assigned to a particular fulfillment task. For example, a product that needs to be shipped/delivered to an entity today will have a higher urgency value than a product that needs to be delivered/shipped to an entity a month from today. Thus, as an impending due date approaches, the urgency value associated with completion or fulfilling a task will typically rise commensurately.

Figure 7:
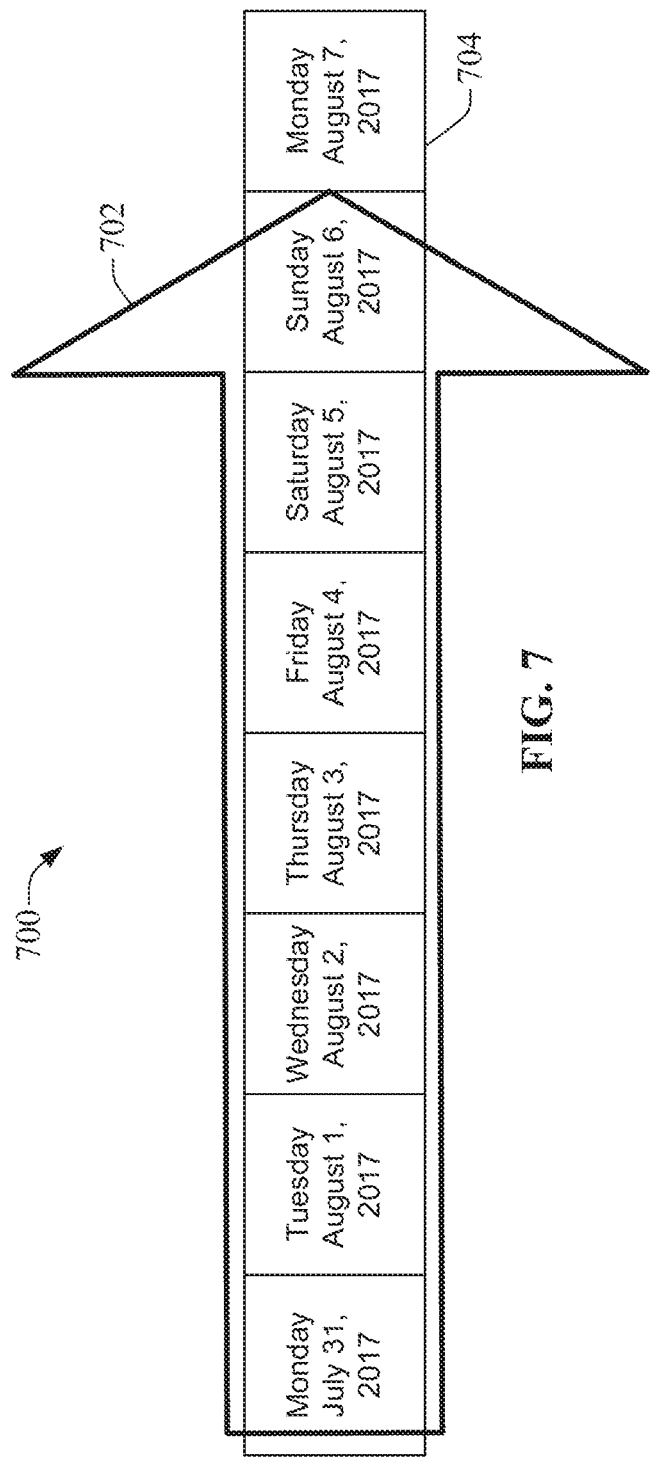
FIG. 7 a sliding window overlaid over a timeline as utilized to facilitate estimation of node processing capacity values for order fulfillment in accordance with one or more embodiments described herein.

In order to determine the urgency value, priority component 302 can employ two processes for assigning a value to a task based on a ranking of tasks by an importance value based on historical data as applied to a future capacity prediction model: utilization of a sliding window process, and/or utilizing a decay function. With reference to FIG. 7 and in the context of the sliding window, priority component 302 can consider only days within a defined distance (as represented by the sliding window 702 overlaid over a timeline 704) prior to the deadline date for completion or fulfillment of the task. For instance, should the date for fulfillment of an order be Saturday, Aug. 5, 2017, priority component 302 can utilize the sliding window 702 to rank the priority of tasks within the sliding window 702 giving the most weight to fulfillment of tasks that need to be completed, for instance, on Monday, Jul. 31, 2017 and the least weight to fulfillment of tasks the need to be completed by Saturday Aug. 5, 2017. Thus, in this instance, and based on use of sliding window 702 overlaid on timeline 704, priority component 302 can assign a respective urgency value to fulfillment tasks that occur within the range of the sliding window 702; assigning higher urgency values to tasks that need to be completed earlier in the timeline 704 and commensurately lower urgency values for tasks that need to be completed later in the timeline 704. In this way, priority component 302 in collaboration with the sliding window process can prioritize fulfillment tasks that appear in the sliding window in contrast to tasks that do not appear in the sliding window. Fulfillment tasks that do not appear in the sliding window can be ignored, albeit temporarily, as such fulfillment tasks typically will not have a bearing on the determination of the urgency value.

Additionally and/or alternatively, priority component 302 can also assign a weighting value to each fulfillment task (or, in some embodiments, one or more fulfillment tasks) based on the immediacy of completing the fulfillment task by a due date. One process that priority component 302 can utilize to assign a weighting value to each fulfillment task (or, in some embodiments, one or more fulfillment tasks) is to use a decay function, such as an exponential decay function. Thus, priority component 302 can assign exponentially larger weight values to tasks that need to be completed prior to an impending and fast approaching due date and can assign exponentially smaller weight values to tasks where the due date for fulfillment is not impending. For instance, a task that needs to be fulfilled tomorrow can be assigned a exponentially greater weight value in contrast to a task that needs to be fulfilled one week from tomorrow. In this way, and through use of a decay function, priority component 302 can ensure that each day (or, in some embodiments, one or more days) in a timeline can have an influence on the assignment and fulfillment of tasks.

Figure 4:
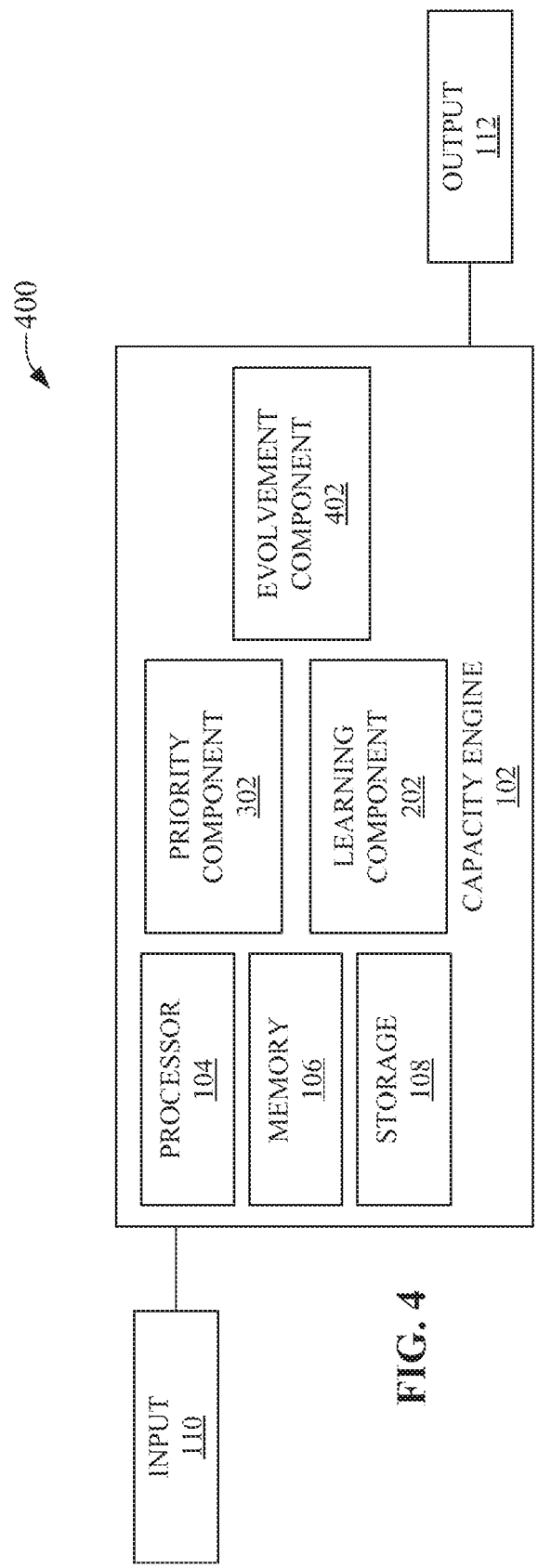
FIG. 4 illustrates another block diagram of an example, non-limiting system that facilitates estimation of node processing capacity values for order fulfillment in accordance with one or more embodiments described herein.

Turning now to FIG. 4, illustrated is another block diagram of an example, non-limiting system that facilitates estimation of node processing capacity values for order fulfillment. Repetitive description of like elements employed in other embodiments described herein is omitted for sake of brevity.

System 400 can comprise one or more of the components and/or functionality of systems 100, 200, 300 and vice versa. As shown, in some embodiments, capacity engine 102 of system 400 can comprise evolvement component 402, priority component 302, and learning component 202, along with one or more other components shown with reference to FIG. 1.

Evolvement component 402 can predict the future processing capacity value for a processing node device in one or more future time periods by considering long-term/short-term patterns that can have been determined from historical data representing historical processing capacities for each processing node device (or, in some embodiments, one or more processing node devices) included in a network of processing node devices that can be modeled as a time series, for example, at an hourly, daily, weekly, monthly, . . . time granularity. The determined hourly, daily, weekly, monthly, . . . current processing capacity can then be considered as a value of a time series that shows periodical patterns at different levels, such as, seasonal patterns caused by seasonal adjustments in various factors, such as labor, machine maintenance schedules, and the like.

To predict the future processing capacity value, evolvement component 402 can use and compare a first time period in a first grouping of time periods with a second time period in a second grouping of time periods, wherein the first time period corresponds with the second time period. For instance, the first time period in the first grouping of time periods can relate to a season and the second time period in the second grouping of time periods can relate (e.g., correspond) to the same season but in successive preceding years. For example, the first time period in the first grouping of time periods can relate to the holiday season of the current year, whereas the second time period in the second grouping of time periods can relate to the same holiday season of the previous year. Similarly, the first time period in the first grouping of time periods and the second time period in the second grouping of time periods can relate to the same day of the week but in different weeks. Further, the first time period in the first grouping of time periods and the second time period in the second grouping of time periods can relate to the same month in different years. Evolvement component 402 can therefore determine patterns from the historical data and these patterns can be used to identify patterns that influence processing capacity of processing node devices. For instance, a pattern can have been noticed that every Monday a particular processing node device has a backlog of tasks to fulfill and as such evolvement component 402 can utilize this information to predict that the processing node will have a backlog of fulfillment tasks for the upcoming Monday and thus can take steps to assign tasks to alternate processing node devices for fulfillment.

Figure 5:
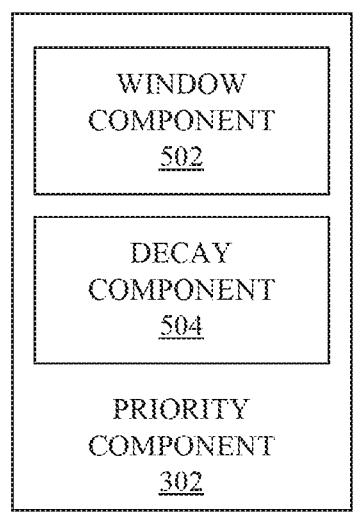
FIG. 5 illustrates another block diagram of an example, non-limiting system that facilitates estimation of node processing capacity values for order fulfillment in accordance with one or more embodiments described herein.

FIG. 5 illustrates another block diagram of an example, non-limiting system that facilitates estimation of node processing capacity values for order fulfillment in accordance with one or more embodiments described herein. Repetitive description of like elements employed in other embodiments described herein is omitted for the sake of brevity.

Non-limiting system 500 can comprise one or more of the components and/or functionality of system 100, 200, 300, 400, and vice versa. As illustrated, priority component 302 can comprise window component 502 and decay component 504. As has been noted above, priority component 302 can provide a time aware prioritization that reflects a level of urgency associated with different days in the order fulfillment paradigm, and as such, priority component 302, through facilities and functionalities provided by window component 502, can employ a sliding window process (see e.g., FIG. 7) to consider only days within a defined distance (as represented in a sliding window 702 overlaid over a timeline 704) prior to a deadline due date for fulfillment of a task. Window component 502 in collaboration with the illustrative sliding window process illustrated in FIG. 7 can rank the priority of tasks that fall within the scope the sliding window, assigning the most weight to the fulfillment of tasks that have impending fulfillment due dates (e.g., tasks that are due for fulfillment today) and assigning the least weight to the fulfillment of tasks that are not due for fulfillment until a subsequent date (e.g., tasks that are not due for fulfillment for several days from today). For instance with reference to FIG. 7 window component 502 can give the most weight to fulfillment of tasks that need to be completed, for instance, on Monday, Jul. 31, 2017 and can give the least weight to fulfillment of tasks that need to be completed by Saturday, Aug. 5, 2017. Based at least on the relative weightings determined by window component 502 through use of the sliding window process relative urgency values can be assigned to the fulfillment of tasks that occur within the range of the sliding window 702, wherein higher urgency values can be assigned to tasks that need to be completed earlier in the timeline 704 and relatively lower urgency values can be assigned to tasks the need to be completed later in the timeline 704. For example, using a scale from 0 to 9, where 9 denotes a high weighting relative to fulfillment date and 0 low weighting relative to fulfillment date, a product that needs to be fulfilled today, Dec. 24, 2016, can be assigned a value of 9 the highest weight, whereas a product that has a fulfillment date of Jan. 25, 2017 can be assigned the lowest weight value of 0. As a further example and using the same 0 to 9 scale, a product with a fulfillment date of today, Dec. 24, 2016, can be assigned a weighting value of 9 to indicate that the product must be be delivered by Christmas day Dec. 25, 2016, whereas a product that needs fulfillment by Dec. 26, 2016 can be associated with a low weighting value of 3. In this manner, use of window component 502 in conjunction with the sliding window process can prioritize fulfillment of tasks that appear in the sliding window in contrast to tasks that do not appear in the sliding window. Fulfillment of tasks that do not appear in the sliding window can be ignored, albeit temporarily, as such task fulfillment will not have a direct bearing on the determination of the urgency values assigned to the fulfillment of tasks that appear within the ambit of the sliding window process.

Additionally and or/alternatively, priority component 302 can also assign weighting values to each fulfillment task (or, in some embodiments, one or more fulfillment tasks) based at least on an immediacy of completing the fulfillment task by a due date. In order to assign weighting values to each fulfillment task (or, in some embodiments, fulfillment tasks) one or more based on an immediacy of completing fulfillment task by a due date, a decay component 504 can assign a weighting value to each task (or, in some embodiments, one or more tasks) based on a decay function, such as an exponential decay function, such that exponentially larger weighting values can be assigned to the fulfillment of tasks that need to be completed immediately prior to impending and fast approaching due dates, and exponentially smaller weighting values can be assigned to tasks where the due date for fulfillment is not so urgent and in the more distant future. For example, a task that needs fulfillment by tomorrow can be assigned an exponentially greater weight than a task that needs to be fulfilled one week from tomorrow. Similarly, a task that needs fulfillment one week from tomorrow can be assigned a greater weight than a task that needs to be fulfilled one month from tomorrow. In this manner, through the use of weighting values determined by decay component 504 and assigned to disparate tasks that need fulfillment, each day (or, in some embodiments, one or more days) in a timeline can have an influence on the assignment and fulfillment of the totality of tasks.

Figure 6:
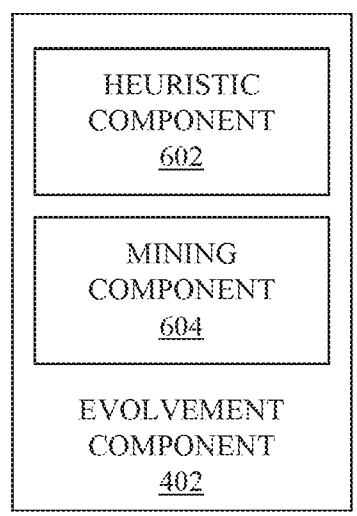
FIG. 6 illustrates another block diagram of an example, non-limiting system that facilitates estimation of node processing capacity values for order fulfillment in accordance with one or more embodiments described herein.

FIG. 6 illustrates a further block diagram of an example, non-limiting system that facilitates estimation of node processing capacity values for order fulfillment in accordance with one or more embodiments described herein. Repetitive description of like elements employed in other embodiments described herein is omitted for the sake of brevity.

Non-limiting system 600 can comprise one or more of the components and/or functionality of system 100, 200, 300, 400, 500, and vice versa. As illustrated evolvement component 402 can comprise heuristic component 602 and mining component 604. Heuristic component 602 can be utilized to determine a future processing capacity value for a processing node device comprising a network of processing node devices in one or more future defined time periods. Heuristic component 602 can determine a future processing capacity value for processing node device for one or more future time periods by considering long-term/short-term patterns that can have been determined from historical data. The historical data can represent historical processing capacities for each processing node device (or, in some embodiments, one or more processing node devices) included in and comprising a network of processing node devices.

Heuristic component 602 can identify a specific day of the week from the historical data, for instance, Wednesday, and can utilize the specific day of the week—Wednesdays—as a reference point into the historical data and determine the historical processing capacity values for a particular processing node device as of the specific day of the week (Wednesdays) in the past, and thereafter can utilize the historical processing capacity values of the specific day of the week to predict future processing capacity values for the processing device for upcoming Wednesdays into the future.

Additionally and or/alternatively, evolvement component 402 can also include mining component 604, wherein mining component 604 can determine a future processing capacity value for processing node devices comprising a network of processing node devices in one or more future defined time periods. Mining component 604, based on the historical data representing historical processing capacities for each processing node device (or, in some embodiments, one or more processing node devices) included in and comprising a network of processing node devices, can model the historical processing capacities for each processing node device (or, in some embodiments, one or more processing node devices) as a time series based on a defined time granularity (e.g., hourly, daily, weekly, monthly, yearly, etc.). The time series for each processing node device (or, in some embodiments, one or more processing node devices) can, by using a wavelet analysis or Fourier analysis, show periodical patterns at different levels of granularity. For example, Fourier analysis can show periodical patterns associated with seasonal patterns caused by seasonal adjustments in various factors of production, such as labor, supply chain delays and variations, machine maintenance schedules, and the like. Fourier analysis can also show periodical patterns associated with environmental factors, such as snow days, ice storms, hurricanes, water shortages, etc. Mining component 604. based on historical periodicities identified in the time series in relation to historical processing capacities of processing node devices comprising a network of processing node devices, can utilize these learned historical periodicities to predict when and if a processing node device will have a backlog of fulfillment tasks for the upcoming defined time period and thus can take steps to assign tasks to alternate processing node devices for fulfillment of an order.

Some of the foregoing processes performed may be performed by specialized computers for carrying out defined tasks related to learning daily processing capacities and determining processing capacity values for each processing node device (or, in some embodiments, one or more processing node devices) included in a network of processing node devices. The subject computer processing systems, computer-implemented methods, apparatuses and/or computer program products can be employed to solve new problems that arise through advancements in technology, computer networks, the Internet and the like. One or more embodiments of the subject computer processing systems, methods, apparatuses and/or computer program products can provide technical improvements to the automated learning of daily processing capacities and determining processing capacity values for each processing node device (or, in some embodiments, one or more processing node devices) included in a network of processing node devices by improving processing efficiency among processing components in learning of daily processing capacities and determining processing capacity values for each processing node device (or, in some embodiments, one or more processing node devices) included in a network of processing node devices, reducing delay in processing performed by the processing components, and/or improving the accuracy in which the processing systems perform learning of daily processing capacities and determining processing capacity values for each processing node device (or, in some embodiments, one or more processing node devices) included in a network of processing node devices.

Figure 8:
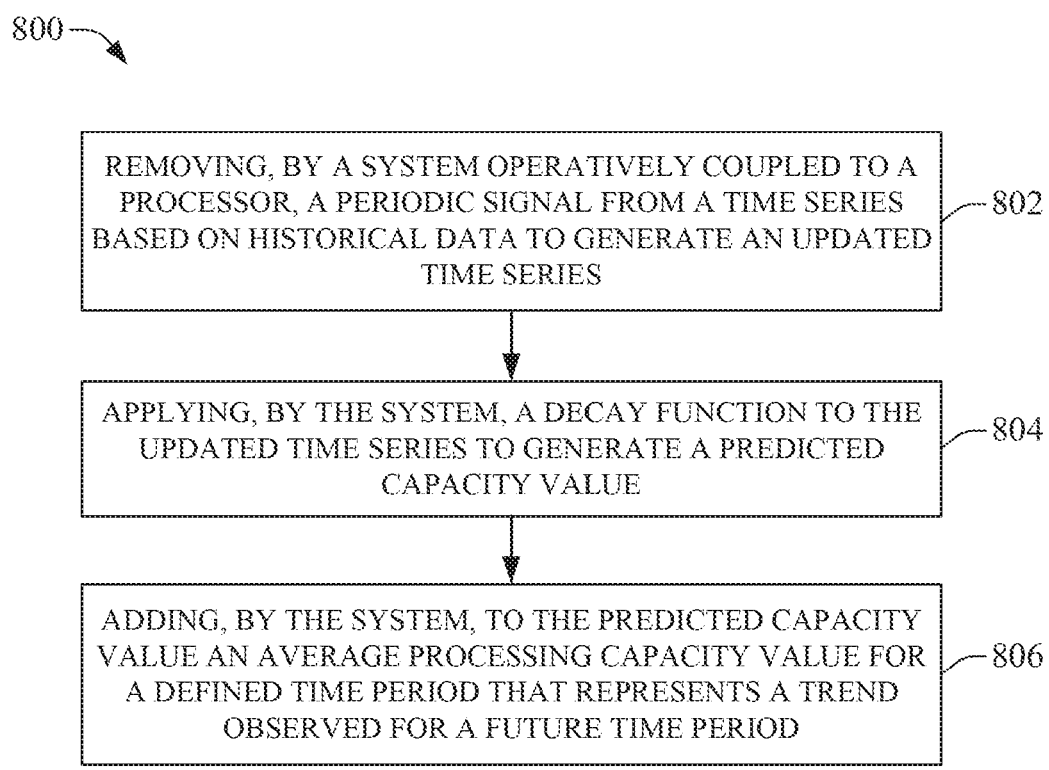
FIG. 8 illustrates a flow diagram of an example, non-limiting computer-implemented method that facilitates estimation of node processing capacity values for order fulfillment in accordance with one or more embodiments described herein.

FIG. 8 illustrates a flow diagram of an example, non-limiting computer-implemented method 800 that facilitates estimation of node processing capacity values for order fulfillment in accordance with one or more embodiments described herein. Repetitive description of like elements employed in other embodiments described herein is omitted for sake of brevity.

At 802, a system (e.g., system 400) operatively coupled to a processor (e.g., capacity engine 102 of system 400) can, through use of learning component 202 and evolvement component 402, remove a periodic signal from a time series based on historical data to generate an updated time series. The periodic signal can be removed from the time series through use of Fourier analysis or a wavelet analysis.

At 804, the system 400, using learning component 202 and priority component 302 can apply a decay function to the updated time series to generate a predicted capacity value, and at 806, system 400 through use of learning component 202 and evolvement component 402 can add to the predicted capacity value an average processing capacity value for a defined time period that represents a trend observed for a future time period.

Figure 9:
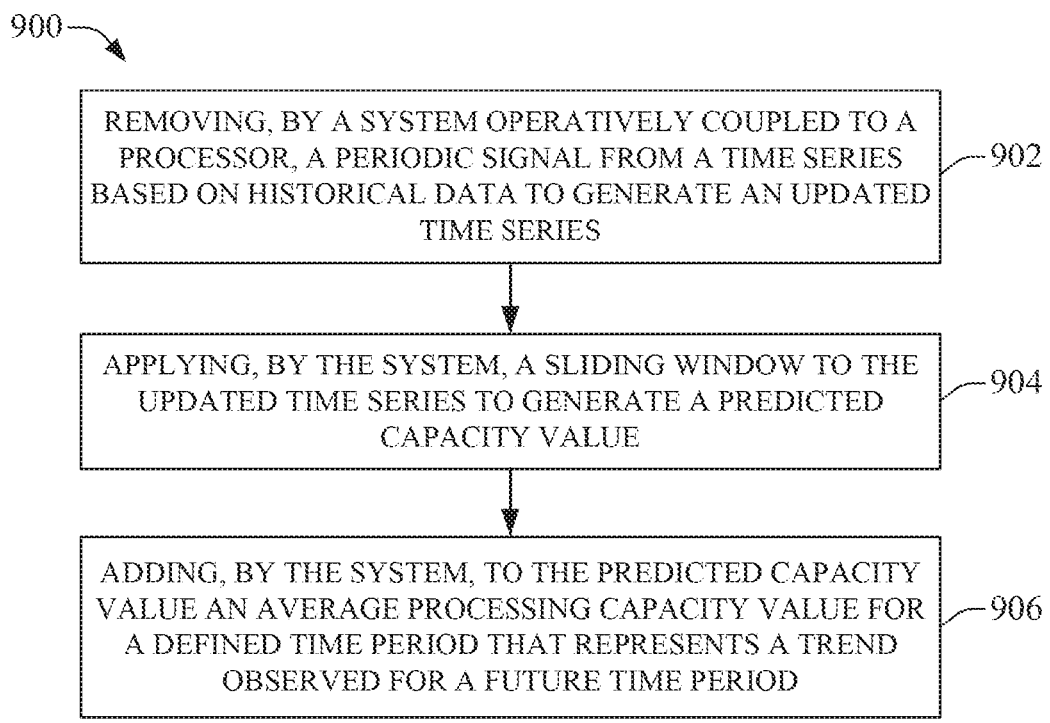
FIG. 9 illustrates a flow diagram of an example, non-limiting computer-implemented method that facilitates estimation of node processing capacity values for order fulfillment in accordance with one or more embodiments described herein.

FIG. 9 illustrates a flow diagram of an example, non-limiting computer-implemented method 900 that facilitates estimation of node processing capacity values for order fulfillment in accordance with one or more embodiments described herein. Repetitive descriptions of like elements employed in other embodiments described herein is omitted for sake of brevity.

At 902, a system (e.g., system 400) operatively coupled to a processor (e.g., capacity engine 102 of system 400) can, through use of learning component 202 and evolvement component 402, remove a periodic signal from a time series based on historical data to generate an updated time series. The periodic signal can be removed from the time series through use of Fourier analysis or a wavelet analysis.

At 904, the system 400, using learning component 202 and priority component 302 can utilize a sliding window process to generate a predicted capacity value, and at 906, system 400 through use of learning component 202 and evolvement component 402 can add to the predicted capacity value an average processing capacity value for a defined time period that represents a trend observed for a future time period and the predicted capacity value.

Figure 10:
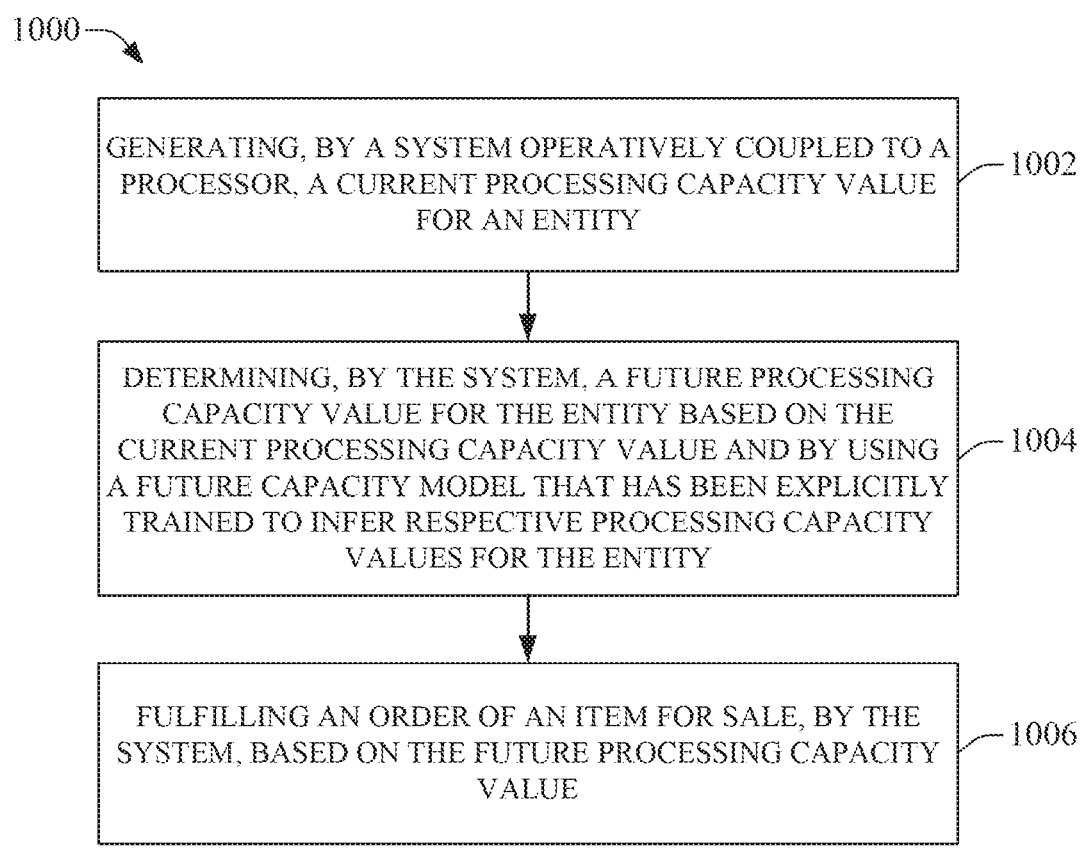
FIG. 10 illustrates a flow diagram of an example, non-limiting computer-implemented method that facilitates estimation of node processing capacity values for order fulfillment in accordance with one or more embodiments described herein.

FIG. 10 illustrates a flow diagram of an example, non-limiting computer-implemented method 1000 that facilitates estimation of node processing capacity values for order fulfillment in accordance with one or more embodiments described herein. Repetitive descriptions of like elements employed with other embodiments described herein is omitted for sake of brevity.

At 1002, a system (e.g., system 400) operatively coupled to a processor (e.g., capacity engine 102 of system 400) can, through use of learning component 202 and evolvement component 402, generate a current processing capacity value for an entity.

At 1004, the system 400, using learning component 202 and priority component 302 can determine a future processing capacity value for the entity based on the current processing capacity value and by using a future capacity model that has been explicitly trained to infer respective processing capacity values for the entity, and at 1006, system 400 through use of learning component 202, priority component 302 and evolvement component 402 can fulfill and order of an item for sale based on the future processing capacity value.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 11:
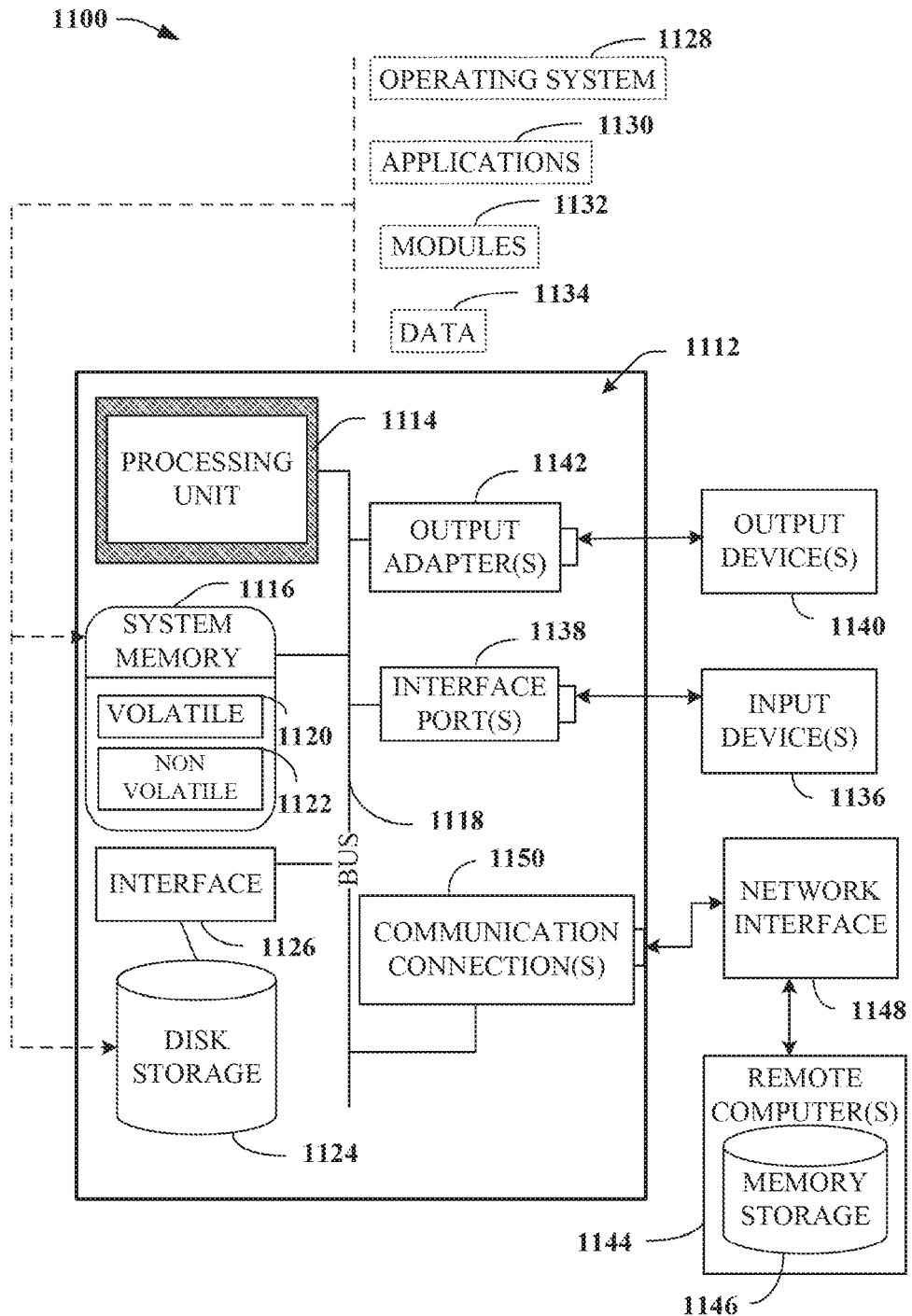
FIG. 11 illustrates a block diagram of an example, non-limiting operating environment in which one or more embodiments described herein can be facilitated.

In order to provide a context for the various aspects of the disclosed subject matter, FIG. 11 as well as the following discussion, are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity.

With reference to FIG. 11, a suitable operating environment 1101 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1101. Such software can also include, for example, an operating system 1128. Operating system 1128, which can be stored on disk storage 1124, acts to control and allocate resources of the computer 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140.

Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows: on-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a high level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of selected networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
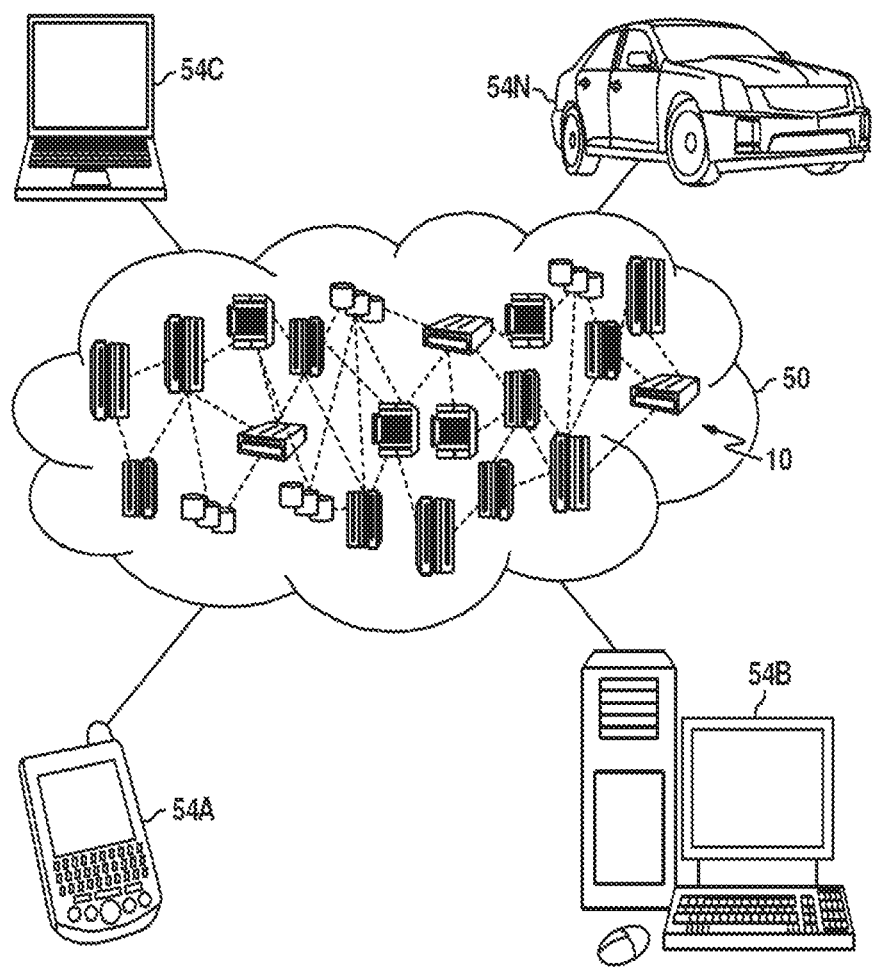
FIG. 12 depicts a cloud computing environment according to an embodiment of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
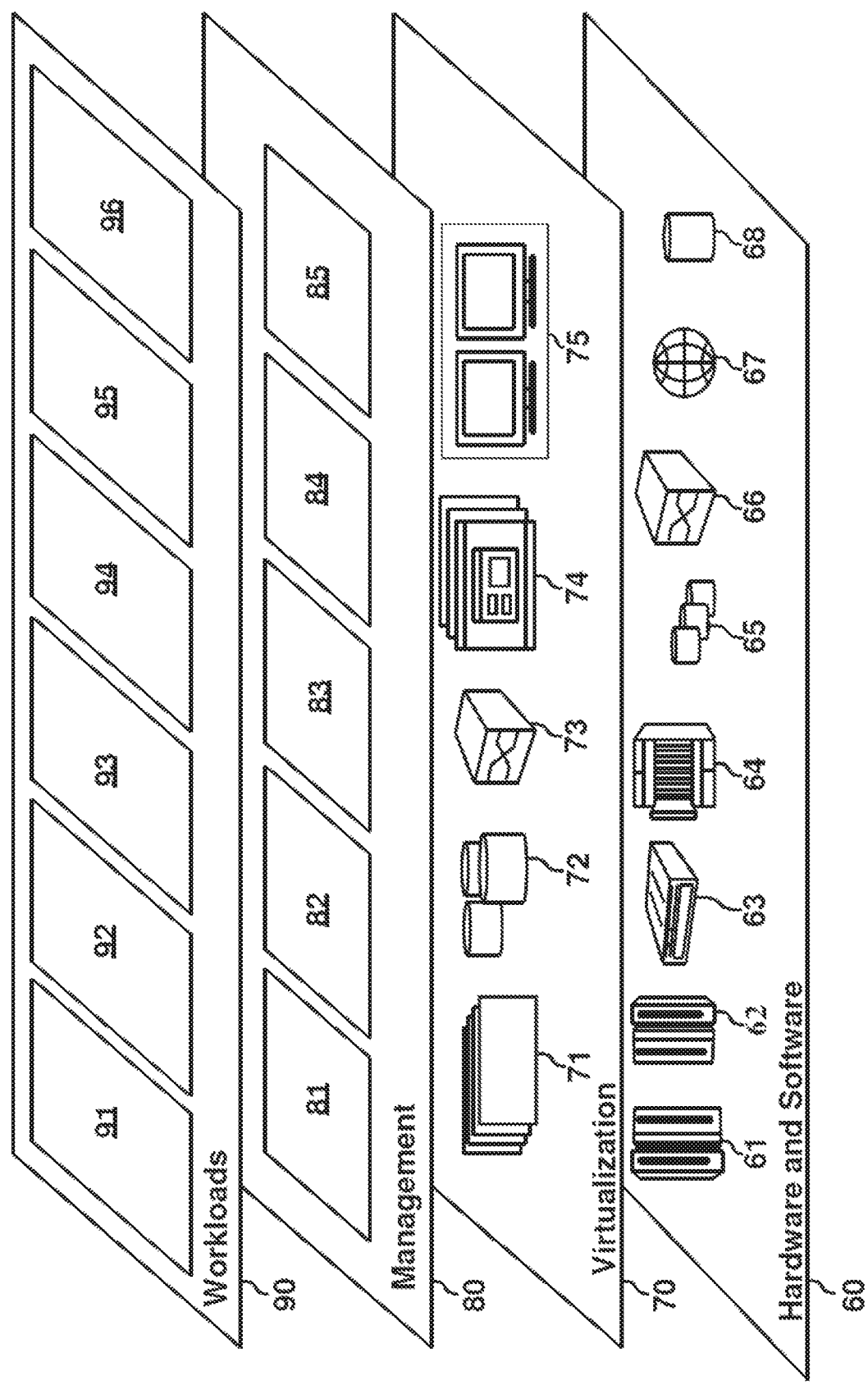
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided: Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, the procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and estimating node processing capacity values for order fulfillment 96.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and number-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transition word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating, by a system operatively coupled to a computer processor, a current processing capacity value of current processing capacities for an entity of entities, wherein the entities are machines associated with a second system;
   determining, by the system, a future processing capacity value for the entity based on the current processing capacity value, by using a future capacity model that has been explicitly trained to infer respective processing capacity values for the entity, and based on historical processing capacity data, wherein the historical processing capacity data is a time series based on a defined time granularity, wherein the time series comprises a plurality of data points, and wherein the time series is an updated time series generated based on removing, by the system, via Fourier analysis, a periodic signal from the time series based on the historical processing capacity data and new data;
   determining, by the system, whether the respective processing capacity of entities results in a service level agreement of a third-party being met, wherein the current processing capacity value is generated based on a value representative of a first number of items for sale minus a second number of items for sale, wherein the first number of items for sale have been assigned to the entity for processing at a commencement of a defined time period and wherein the second number of items for sale have not been processed by the entity at the commencement of a next defined time period;
   fulfilling an order of an item for sale, by the system, based on the future processing capacity value, wherein the fulfilling the order comprises generating an electronic signal within the system and controlling the second system comprising a computer, processor and machines, wherein the second system is directly coupled to the system, and the second system automatically and autonomously operates to physically output the item for sale on a defined day based on the determining the future processing capacity value, and wherein the generating, determining the future processing capacity value, determining whether the respective processing capacity of entities results in a service level agreement of a third-party being met, and the fulfilling the order improves processing efficiency among processing components in learning of the current processing capacities.

2. The computer-implemented method of claim 1, wherein the future processing capacity value is indicative of a prediction representative of a future processing capability of the entity to process items for sale in successive defined time periods.

3. The computer-implemented method of claim 1, wherein the current processing capacity value is generated based on a historical capacity value for the entity.

4. The computer-implemented method of claim 3, wherein the historical capacity value is generated based on a time series model.

5. The computer-implemented method of claim 4, wherein the time series evaluation model k associated with periodic patterns representative of or variations in a factor of production.

6. The computer-implemented method of claim 1, wherein the future processing capacity value is determined by associating a weighting value to the current processing capacity value.

7. The computer-implemented method of claim 1, further comprising: applying, by the system, an exponential decay function, to the updated time series to generate a predicted capacity value for a processing node device of the one or more processing node devices.

8. The computer-implemented method of claim 1, further comprising:
assigning, by the system, different weighting values to respective fulfillment tasks employing an exponential decay function, wherein the different weighting values are selected based on a priority of a fulfillment tasks of the respective fulfillment tasks, and wherein a first weight value is a assigned to a fulfillment task that needs to be completed prior to a second fulfillment task, and the second weight value is assigned a value lower than the first weight value.

9. The computer-implemented method of claim 1, further comprising:
generating, by the system, via wavelet analysis of a plurality of time series, information indicative of respective periodical patterns at different levels of granularity for a respective processing node device of the processing node devices.

10. The computer-implemented method of claim 1, further comprising:
controlling, by the system, operation of the entities across a network of the entities to perform workload balancing across the entities.

\* \* \* \* \*